(12) United States Patent
Nakamura et al.

(10) Patent No.: US 9,441,709 B2
(45) Date of Patent: Sep. 13, 2016

(54) AUTOMATIC TRANSMISSION

(71) Applicant: AISIN SEIKI KABUSHIKI KAISHA, Kariya-shi (JP)

(72) Inventors: Hideki Nakamura, Nagoya (JP); Kiyoharu Takagi, Okazaki (JP); Atsuhiro Mase, Chita-gun (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 92 days.

(21) Appl. No.: 14/529,763

(22) Filed: Oct. 31, 2014

(65) Prior Publication Data
US 2015/0133259 A1    May 14, 2015

(30) Foreign Application Priority Data

Nov. 8, 2013  (JP) .................................. 2013-231956

(51) Int. Cl.
*F16H 3/66* (2006.01)
*F16H 3/62* (2006.01)

(52) U.S. Cl.
CPC  *F16H 3/66* (2013.01); *F16H 3/62* (2013.01); *F16H 2200/0069* (2013.01); *F16H 2200/2012* (2013.01); *F16H 2200/2046* (2013.01); *F16H 2200/2064* (2013.01); *F16H 2200/2094* (2013.01)

(58) Field of Classification Search
USPC ........................................................ 475/318
See application file for complete search history.

(56) References Cited

U.S. PATENT DOCUMENTS

| | | | |
|---|---|---|---|
| 6,572,507 B1 * | 6/2003 | Korkmaz | F16H 3/66 475/276 |
| 7,131,926 B2 | 11/2006 | Tiesler et al. | |
| 7,140,996 B2 * | 11/2006 | Tiesler | F16H 3/666 475/275 |
| 7,156,767 B2 * | 1/2007 | Tiesler | F16H 3/666 475/286 |
| 2012/0196716 A1 * | 8/2012 | Rosemeier | B60K 17/165 475/205 |

* cited by examiner

*Primary Examiner* — Robert Hodge
*Assistant Examiner* — Ryan Dodd
(74) *Attorney, Agent, or Firm* — Oblon, McClelland, Maier & Neustadt, L.L.P.

(57) ABSTRACT

An automatic transmission includes plural planetary gear mechanisms rotatably supported by a housing to be coaxial to a rotation axis, a ring gear of the foremost planetary gear mechanism being connected to a sun gear of the rearmost planetary gear mechanism, an input shaft being connected to a carrier of the foremost planetary gear mechanism, an output shaft being connected to a carrier of the rearmost planetary gear mechanism, a rotation member positioned at a radially outward of the ring gear of the rearmost planetary gear mechanism to be rotatable coaxially to the ring gear of the rearmost planetary gear mechanism, a brake selectively fixing the rotation member to the housing, a clutch selectively connecting the rotation member and a carrier of the planetary gear mechanism positioned at front relative to the rearmost planetary gear mechanism by one, and a dog clutch selectively connecting the ring gear of the rearmost planetary gear mechanism and the rotation member.

3 Claims, 9 Drawing Sheets

| | CL1 | CL2 | CL3 | CL4 | B1 | B2 | D1 |
|---|---|---|---|---|---|---|---|
| 1st | ○ | ○ | | | | ○ | |
| 2nd | | ○ | | ○ | | ○ | |
| 3rd | | ○ | | | ○ | ○ | |
| 4th | | ○ | ○ | | | ○ | |
| 5th | | ○ | ○ | ○ | ○ | | |
| 6th | | | ○ | ○ | | | |
| 7th | | | ○ | | ○ | | |
| 8th | ○ | | ○ | ○ | ○ | | |
| 9th | ○ | ○ | | | ○ | | |
| 10th | ○ | | | | ○ | | |
| Rev | | | ○ | ○ | | ○ | ● |

AUTOMATIC TRANSMISSION

CROSS REFERENCE TO RELATED APPLICATIONS

This application is based on and claims priority under 35 U.S.C. §119 to Japanese Patent Application 2013-231956, filed on Nov. 8, 2013, the entire content of which is incorporated herein by reference.

TECHNICAL FIELD

This disclosure generally relates to an automatic transmission.

BACKGROUND DISCUSSION

U.S. Pat. No. 7,131,926B (hereinafter referred to Patent reference 1) discloses a known automatic transmission which includes three single pinion type planetary gear mechanisms and six engaging elements including two brakes and four clutches that selectively engage and disengage elements of the planetary gear mechanisms. The known automatic transmission disclosed in Patent reference 1 establishes nine forward speeds and one reverse speed by selectively engaging and disengaging the mentioned six engaging elements.

According to the automatic transmission disclosed in Patent reference 1, when a reverse gear stage is established, a sun gear of a third planetary gear set rotates in a reverse direction because a ring gear of the third planetary gear set is fixed to a housing by means of a brake and a planetary carrier provided at the third planetary gear set and connected to an output shaft rotates in a reverse direction. Whereas a ring gear provided at a first planetary gear set and connected to the sun gear of the third planetary gear set rotates in a reverse direction, because a planetary carrier provided at the first planetary gear set and connected to an input shaft rotates in a normal direction, a sun gear of the first planetary gear set rotates in high speed. Thus, durability of a member, for example, a bearing that supports the sun gear of the first planetary gear set is deteriorated. Further, because a relative rotation speed of a brake that is connected to the sun gear of the first planetary gear set is increased, the brake may be damaged, for example, burned. Still further, in a case where an oil passage is formed on a shaft that is directly connected to the sun gear of the first planetary gear set, durability of a seal ring that is in contact with the shaft is deteriorated.

A need thus exists for an automatic transmission which is not susceptible to the drawback mentioned above.

SUMMARY

In light of the foregoing, the disclosure provides an automatic transmission, which includes a housing, plural planetary gear mechanisms rotatably supported by the housing to be coaxial to a rotation axis, the plural planetary gear mechanisms including a planetary gear mechanism positioned at a foremost row which includes a ring gear and a carrier, and a planetary gear mechanism positioned at a rearmost row which includes a sun gear, a carrier and a ring gear, the ring gear of the planetary gear mechanism positioned at the foremost row being connected to the sun gear of the planetary gear mechanism positioned at the rearmost row, an input shaft rotatably supported by the housing to be rotatable about the rotation axis and being connected to the carrier of the planetary gear mechanism positioned at the foremost row, an output shaft rotatably supported by the housing to be rotatable about the rotation axis and being connected to the carrier of the planetary gear mechanism positioned at the rearmost row, a rotation member positioned at a radially outward of the ring gear of the planetary gear mechanism positioned at the rearmost row to be rotatable coaxially to the ring gear of the planetary gear mechanism positioned at the rearmost row, a brake selectively fixing the rotation member to the housing, a clutch selectively connecting the rotation member and a carrier of the planetary gear mechanism positioned at front relative to the planetary gear mechanism positioned at the rearmost row by one, and a dog clutch selectively connecting the ring gear of the planetary gear mechanism positioned at the rearmost row and the rotation member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Embodiments of an automatic transmission will be explained with reference to illustrations of drawing figures as follows. According to the embodiments, the automatic transmission changes rotational drive force that an engine mounted to a vehicle outputs. The vehicle is configured to move forward and backward with a predetermined speed stage that is established by the automatic transmission, where the rotational drive force changed by the automatic transmission is transmitted to driving wheels via, for example, a differential device.

Figure 1:
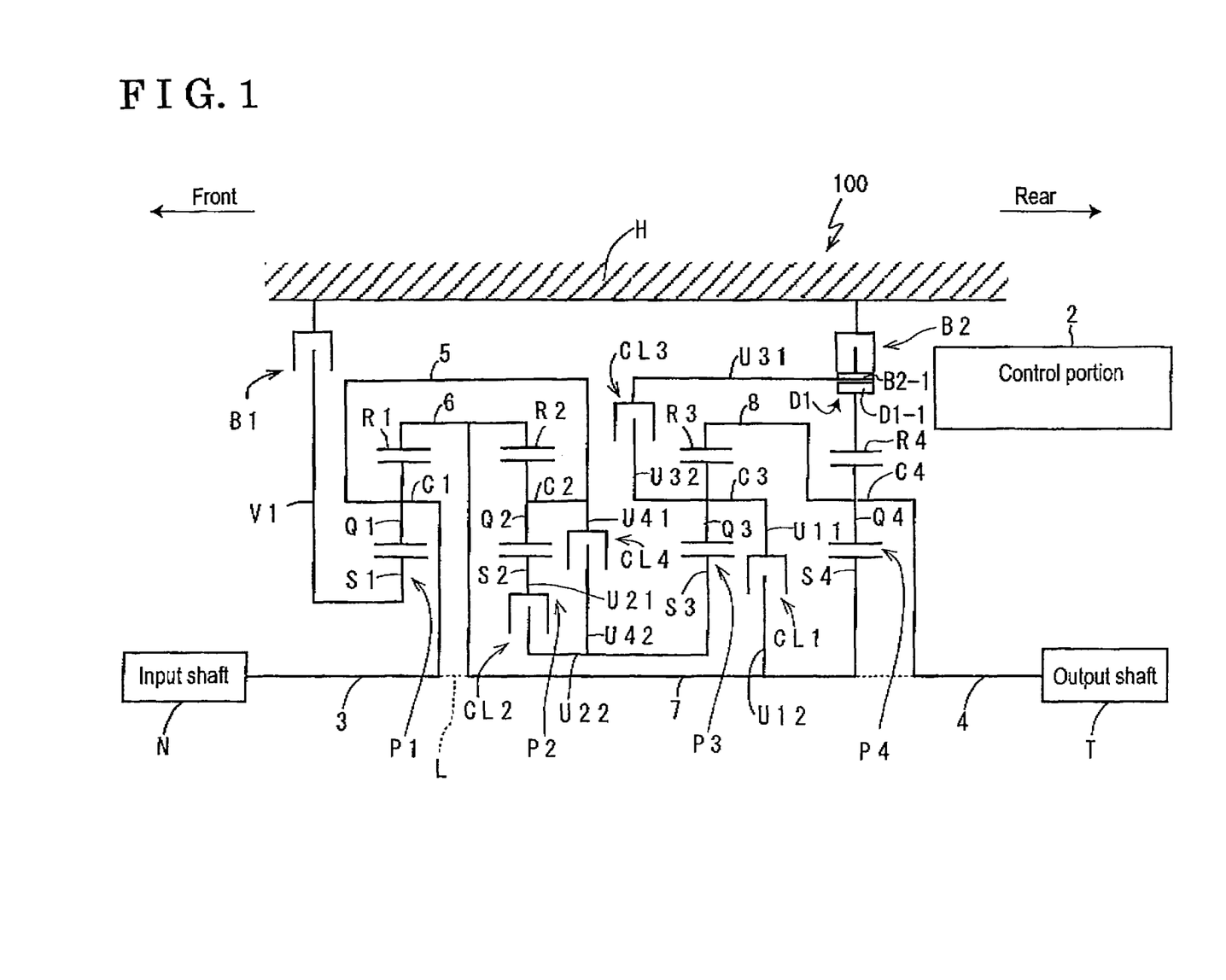
FIG. 1 is a schematic view of an automatic transmission according to a first embodiment disclosed here.

Constructions of an automatic transmission 100 according to the first embodiment will be explained with reference to FIG. 1 As illustrated in FIG. 1, the automatic transmission 100 includes four planetary gear mechanisms P1-P4 (first to fourth planetary gear mechanism P1-P4) that are arranged in a direction of a rotation axis L from an input side (i.e., left-hand side in FIG. 1, defined as a front side) towards an output side (i.e., right-hand side in FIG. 1, defined as a rear side), four clutches CL1-CL4 (first to fourth clutches CL1-CL4) selectively connecting plural elements, two brakes B1, B2 (first and second brakes B1, B2) braking the rotation of predetermined elements, a dog clutch D1, connection members 3-8, V1, U11, U12, U21, U22, U31, U32, U41, U42 that connect each of the elements, an input shaft N, and an output shaft T.

The automatic transmission 100 is configured to control operation states of engaging elements structured with the first to fourth clutches CL1-CL4, and the first and second brakes B1, B2 on the basis of a control signal by a control portion 2. According to the embodiment, by actuating three engaging elements among the engaging elements described above, a rotational drive force inputted from the input shaft N is changed to one of selected ten forward speeds and one reverse speed to be outputted from the output shaft T. The operation states of the engaging elements and shift stages, or speeds that are established will be explained hereinafter.

The input shaft N and the output shaft T are rotatably supported at a housing H to rotate about the rotation axis L. The input shaft N is configured to input the rotational drive force of the engine to the automatic transmission 100 via a clutch apparatus. The output shaft T is positioned coaxially with the input shaft N, and outputs rotational drive force with changed speed to driving wheels via, for example, a differential apparatus.

A single pinion type planetary gear is applied as each of the planetary gear mechanisms P1-P4 in which a pinion gear set Q1-Q4 rotatably supported by a carrier C1-C4 is engaged with a sun gear S1-S4 and a ring gear R1-R4. The planetary gear mechanisms P1-P4 are defined as a first planetary gear mechanism P1, a second planetary gear mechanism P2, a third planetary gear mechanism P3, and a fourth planetary gear mechanism P4 in the arranged order from the input shaft side. The elements of the first to fourth planetary gear mechanisms P1-P4 are defined as first to fourth sun gears S1-S4, first to fourth ring gears R1-R4, and first to fourth carriers C1-C4.

The first planetary gear mechanism P1 includes the first sun gear S1 rotatably supported and being coaxial to the rotation axis L, the first ring gear R1, and the first carrier C1 that supports the first pinion gear set Q1 that engages with the first sun gear S1 and the first ring gear R1.

The second planetary gear mechanism P2 includes the second sun gear S2 rotatably supported and being coaxial to the rotation axis L, the second ring gear R2, and the second carrier C2 that supports the second pinion gear set Q2 that engages with the second sun gear S2 and the second ring gear R2.

The third planetary gear mechanism P3 includes the third sun gear S3 rotatably supported and being coaxial to the rotation axis L, the third ring gear R3, and the third carrier C3 that supports the third pinion gear set Q3 that engages with the third sun gear S3 and the third ring gear R3.

The fourth planetary gear mechanism P4 includes the fourth sun gear S4 rotatably supported and being coaxial to the rotation axis L, the fourth ring gear R4, and the fourth carrier C4 that supports the fourth pinion gear set Q4 that engages with the fourth sun gear S4 and the fourth ring gear R4.

Each of the first and second brakes B1, B2 provided at the housing H is an engaging element for braking the rotation of the predetermined elements. According to the embodiment, similarly to the clutches CL1-CL4, a hydraulic pressure type brake that is actuated by the hydraulic pressure supplied via a hydraulic passage formed on the housing H is applied as each of the first and second brakes B1, B2. According to the brake B1, B2, when the hydraulic pressure is supplied from a hydraulic pressure pump actuated on the basis of a control command by the control portion 2, the pressure is applied to brake discs (e.g., B2-2 shown in FIG. 4) of the brake B1, B2, and the brake B1, B2 brakes the rotation of the targeted predetermined elements and fixes the predetermined element to the housing H. Then, when the supply of the hydraulic pressure by the hydraulic pressure pump is blocked, the brake B1, B2 separates the brake discs to allow the rotation of the predetermined element.

Each of the clutches CL1-CL4 is an engaging element that selectively connects plural elements. According to the embodiment, the clutch CL1-CL4 is a normal open type hydraulic pressure type clutch that is actuated by the supplied hydraulic pressure. Thus, when the hydraulic pressure is supplied to the clutch CL1-CL4 via a hydraulic passage formed on the housing H and the input shaft N from the hydraulic pump actuated on the basis of control commands by the control portion 2, plural clutch discs come in contact with each other to connect the elements so that the driving force is transmitted between the targeted elements. Then, when the supplying of the hydraulic pressure by the hydraulic pressure pump is blocked, or stopped, the clutch discs are separated to disengage the elements so that the driving force is not transmitted between the targeted elements.

The input shaft N is directly connected to the first carrier C1 via the input shaft connection member 3 that extends in the axial direction passing through an inner side relative to the first sun gear S1. The output shaft T is directly connected to the fourth carrier C4 via the output shaft connection member 4.

The first carrier C1 and the second carrier C2 are directly connected via the first gear connection member 5 that extends in the axial direction passing through an outer side relative to the first and second ring gears R1, R2.

The first ring gear R1 and the second ring gear R2 are directly connected via the second gear connection member 6. The first and second ring gears R1, R2 are directly connected to the fourth sun gear S4 via the third gear connection member 7 which is directly connected to the second gear connection member 6 and which extends in the axial direction passing through an inner side relative to the second and third sun gears S2, S3. The third ring gear R3 and the fourth carrier C4 are directly connected via the fourth gear connection member 8.

The first brake B1 brakes the rotation of the first sun gear S1 directly connected to the first brake connection member V1 via the first brake connection member V1, and selectively fixes the first sun gear S1 to the housing H (is configured to fix the first sun gear S1 to the housing H). The second brake (i.e., serving as a brake) B2 brakes the rotation of a rotation member B2-1 and selectively fixes the rotation member B2-1 to the housing H (is configured to fix the rotation member B2-1 to the housing H).

The first clutch CL1 is directly connected to the third carrier C3 via the first clutch connection member U11, and selectively connects the third carrier C3 and the first and second ring gears R1, R2 (and is configured to connect and disconnect the third carrier C3 to and from the first and second ring gears R1, R2) via the first clutch connection member U12 directly connected to the third gear connection member 7.

The second clutch CL2 is directly connected to the second sun gear S2 via the second clutch connection member U21 and selectively connects the second sun gear S2 and the third sun gear S3 (and is configured to connect and disconnect the second sun gear S2 and the third sun gear S3) via the second clutch connection member U22 directly connected to the third sun gear S3.

The third clutch CL3 is directly connected to the rotation member B2-1 of the second brake B2 via the third clutch direct connection member U31 that extends in the axial direction passing through an outer side relative to the third ring gear R3. The third clutch CL3 selectively connects the rotation member B2-1 and the third carrier C3 (the third clutch CL3 is configured to connect and disconnect the rotation member B2-1 and the third carrier C3) via the third clutch connection member U32 directly connected to the third carrier C3.

The fourth clutch CL4 is directly connected to the first gear connection member 5 via the fourth clutch direct connection member U41 and selectively connects the first and second carriers C1, C2 and the third sun gear S3 (and is configured to connect and disconnect the first and second carriers C1, C2 to and from the third sun gear S3) via the fourth clutch connection member U42 that is directly connected to the second clutch connection member U22.

The dog clutch D1 selectively connects the rotation member B2-1 of the second brake B2 and the fourth ring gear R4 (the dog clutch D1 is configured to connect and disconnect the rotation member B2-1 of the second brake B2 and the fourth ring gear R4). The dog clutch D1 is a normal closed type clutch and is actuated by a dog clutch actuator 71 (see FIG. 4). Upon the actuation of the dog clutch actuator 71 in accordance with a control command by the control portion 2, the dog clutch D1 disengages the rotation member B2-1 of the second brake B2 from the fourth ring gear R4 or engages the rotation member B2-1 of the second brake B2 with the fourth ring gear R4. Details of the dog clutch D1 construction will be explained with reference to FIGS. 4 to 7.

Figure 4:
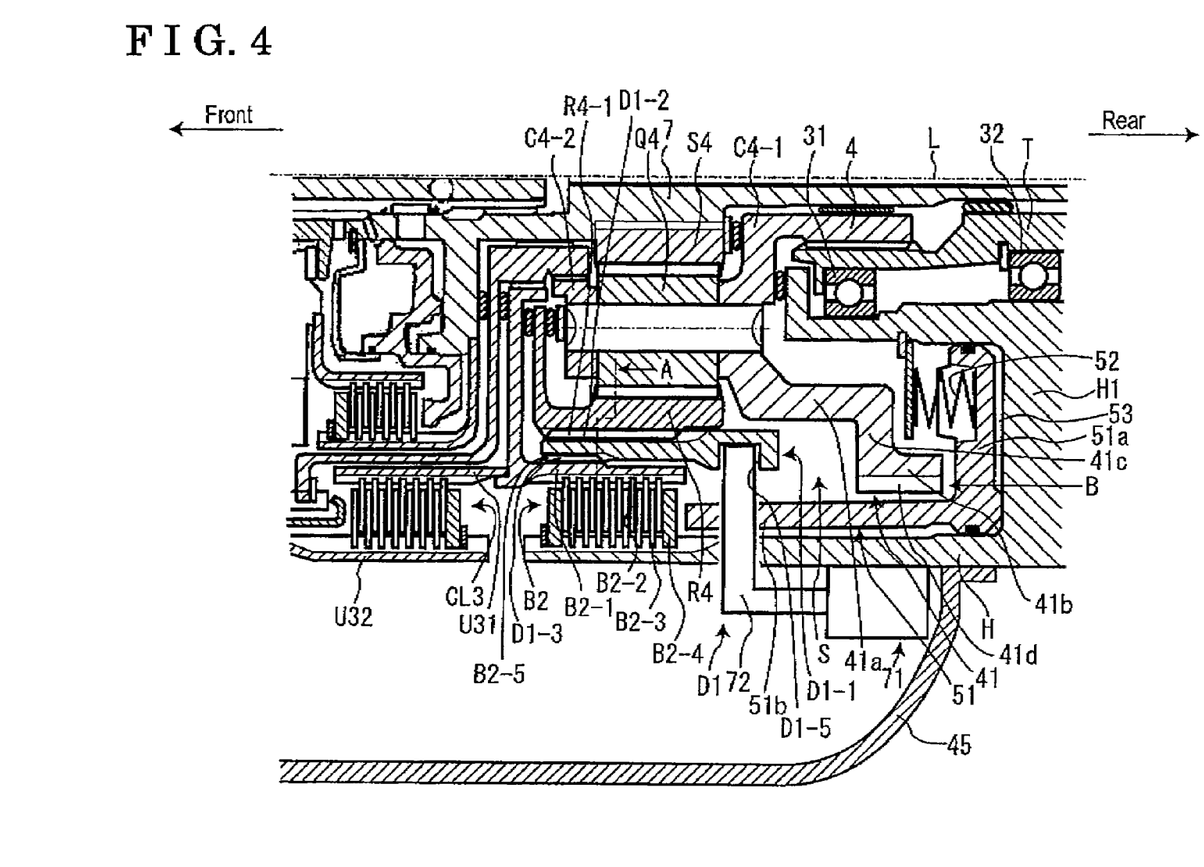
FIG. 4 is a cross-sectional view of a rear portion of the automatic transmission in a state where a dog clutch is engaged according to the first embodiment disclosed here.

Constructions of a rear portion of the automatic transmission 100 according to the first embodiment will be explained with reference to FIGS. 4 to 7. As illustrated in FIG. 4, the output shaft T is formed extending in the direction of rotation axis L and is formed in a cylindrical shape. The output shaft T is rotatably supported at a rear portion of the housing H by means of two bearings 31, 32 which are attached to the housing H at positions being separated from each other. Thus, because the output shaft T is supported at two positions by the bearings 31, 32 which are positioned away from each other, the output shaft T does not bend in a direction orthogonal to the direction of the rotation axis L.

As illustrated in FIG. 4, the fourth carrier C4 includes a rear side fourth carrier C4-1 that is provided at a rear of the fourth pinion gear set Q4 and a front side fourth carrier C4-2 that is provided at a front of the fourth pinion gear set Q4. The output shaft connection member 4 is formed in a cylindrical shape and extends in a rearward direction from a rear portion of the rear side fourth carrier C4-1. An outer circumference portion of the rear portion of the output shaft connection member 4 is fitted to an inner circumference portion of a front portion of the output shaft T via a spline.

A parking member 41 having a substantially cylindrical shape extends in a rearward direction from the rear portion of the rear side fourth carrier C4-1. The parking member 41 is provided coaxially to the output shaft connection member 4 and the output shaft T, and is positioned outside the outer periphery of the output shaft T. The parking member 41 includes a small diameter portion 41a, a large diameter portion 41b, and a connection portion 41c. The small diameter portion 41a is formed in a cylindrical shape and is connected to the rear portion of the rear side fourth carrier C4-1. The large diameter portion 41b is formed in a cylindrical shape having an inner diameter and an outer diameter that are greater than an inner diameter and an outer diameter of the small diameter portion 41a. The large diameter portion 41b is provided at a rear of the smaller diameter portion 41a to be coaxial to the small diameter portion 41a. The connection portion 41c connects a rear end of the small diameter portion 41a and a front end of the large diameter portion 41b.

Figure 6:
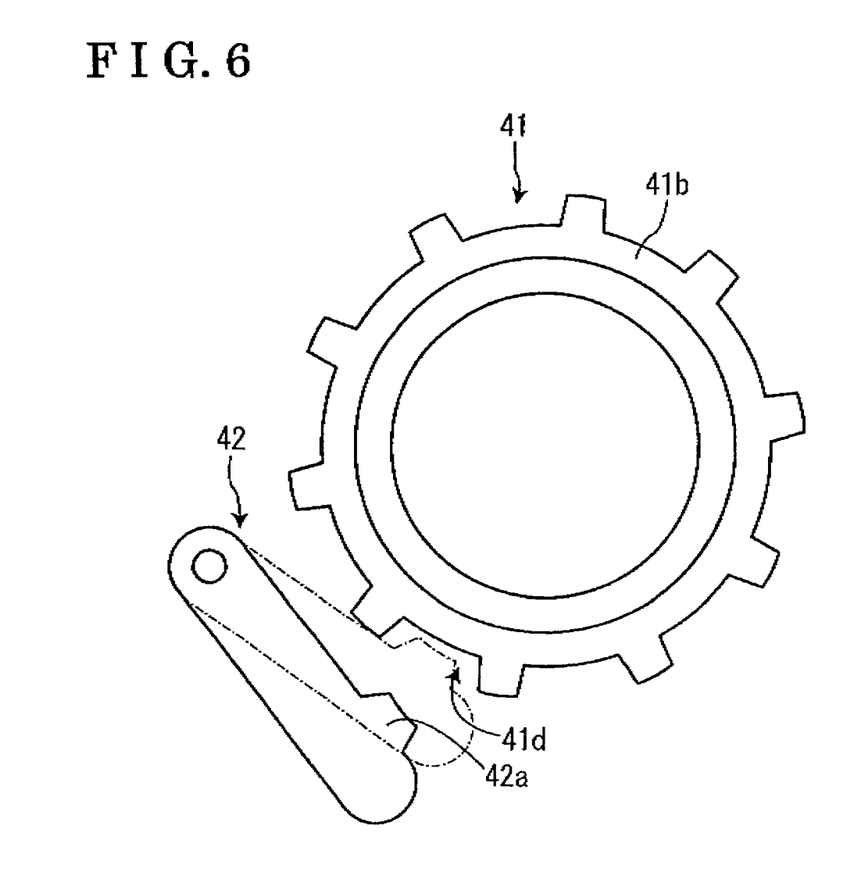
FIG. 6 shows a parking member which is viewed from an arrowed direction B in FIG. 4.

As illustrated in FIG. 6, engaging recess portions 41d are formed on an outer periphery portion of the large diameter portion 41b of the parking member 41 at every predetermined angle in a circumferential direction. A stopper member 42 formed with an engaging projection 42a at an end portion thereof is provided at the housing H and the stopper member 42 is configured to pivot. The stopper member 42 is rotated (pivoted) by a parking actuator. When a shift lever is shifted to be positioned at a parking position, the stopper member 42 pivots so that the engaging projection 42a comes to engage with the engaging recess portion 41d (see a chain dotted line in FIG. 6) by the parking actuator. In those circumstances, the parking member 41 is fixed to the housing H, the fourth carrier C4 is fixed to the housing H, and the planetary gear mechanisms P1-P4 and the output shaft T do not rotate relative to the housing H.

The second brake 32 includes the rotation member B2-1, plural brake discs B2-2, plural brake plates B2-3, and a pressure receiving member B2-4. The rotation member B2-1 is formed in a cylindrical shape and is provided at an outer position relative to an engagement member D1-1 of the dog clutch D1 (fourth ring gear R4) to be coaxial to the fourth ring gear R4 and the engagement member D1-1 and to be rotatable relative to the housing H.

Each of the brake discs B2-2 is formed in a ring shape and is provided at the rotation member B2-1 so as to be movable in a front-rear direction and so as not be relatively rotatable. Each of the brake plates B2-3 is formed in a ring shape and is provided at the housing H so as to be movable in a front-rear direction and so as not be relatively rotatable. The plural brake discs B2-2 and the plural brake plates B2-3 are alternately stacked. The pressure receiving member B2-4 is formed in a ring shape and is provided at the housing H and being adjacent to a rear of the brake plate B2-3 to be movable in a front-rear direction.

An oil pan 45 that stores the oil is attached at a lower end of the housing H. A second brake piston 51 is provided inside a rear portion of the housing H to be slidable in a front-rear direction. The second brake piston 51 includes a disc shaped base portion 51a formed at a rear portion and a pressure applying portion 51b that extends from the base portion 51a in a forward direction. The pressure applying portion 51b faces the pressure receiving member B2-4 of the second brake B2 (the pressure applying portion 51b is positioned opposing to the pressure receiving member B2-4 of the second brake B2).

The base portion 51a is biased in a reward direction by a spring 52 attached to the housing H. A pressure chamber 53 is formed between the base portion 51a and a rear portion wall H1 of the housing H. When the hydraulic pressure is supplied to the pressure chamber, the second brake piston 51 moves forwards, the pressure applying portion 51b applies the pressure to the pressure receiving member B2-4, the brake discs B2-2 and the brake plates B2-3 are pressed against one another, and the second brake B2 is engaged (an engaged state of the second brake B2 is established) by a frictional force between the brake discs B2-2 and the brake plates B2-3. On the other hand, when the hydraulic pressure supplied to the pressure chamber 53 is lost, the pressure applying portion 51b is disengaged from the pressure receiving member B2-4 by the biasing force of the spring 52 so that the second brake B2 is disengaged (disengaged state of the second brake B2 is established).

Figure 5:
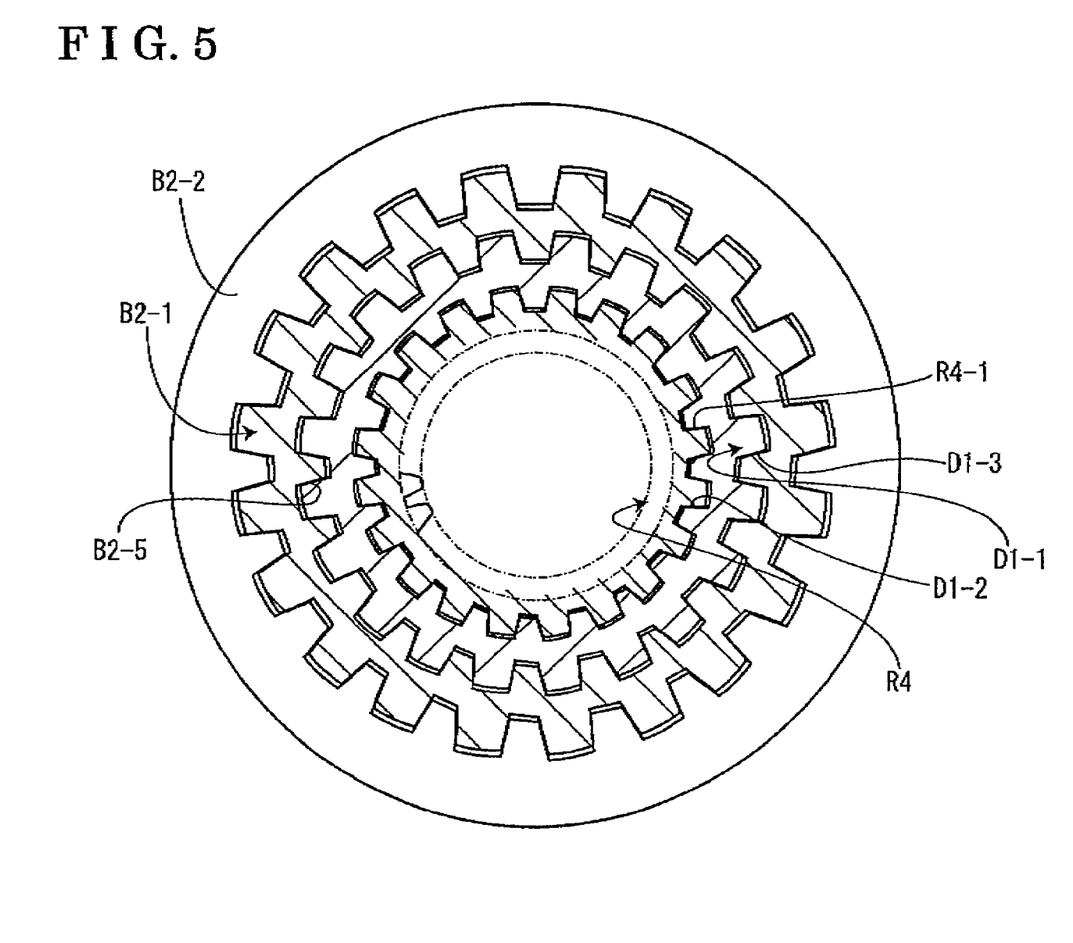
FIG. 5 is a cross-sectional view seen from an arrowed direction A in FIG. 4.

The dog clutch D1 includes the engagement member D1-1, a fork member (i.e., serving as a transmission member) 72, and the dog clutch actuator 71. As illustrated in FIG. 5, ring gear spline grooves R4-1 are formed on an outer periphery surface of the fourth ring gear R4. Further, rotation member spline grooves B2-5 are formed on an inner periphery surface of the rotation member B2-1.

The engagement member D1-1 is cylindrically formed and is provided between the fourth ring gear R4 and the rotation member B2-1 to be coaxially to the fourth ring gear R4 and the rotation member B2-1 and to be movable in the direction of the rotation axis L (front-rear direction). First spline grooves D1-2 that are fitted to the ring gear spline grooves R4-1, respectively, are formed on an inner periphery surface of the engagement member D1-1. Second spline grooves D1-3 that are selectively engaged with (that engages with or disengages from) rotation member spline grooves B2-5 by means of spline are formed on the outer periphery surface of the engagement member D1-1.

As illustrated in FIG. 4, the rotation member spline grooves B2-5 are formed shorter than the ring gear spline grooves R4-1 in a front-rear direction, and are not formed at the position corresponding to the rear portion of the ring gear spline grooves R4-1. Irrespective of the position of the engagement member D1-1 in the front-rear direction (the direction of rotation axis L), the first spline grooves D1-2 are always engaged with the ring gear spline grooves R4-1, respectively, with spline. In a case where the engagement member D1-1 is positioned at a front position within a moving range thereof (i.e., see FIG. 4), the second spline grooves D1-3 are engaged with the rotation member spline grooves B2-5 of the rotation member B2-1 by spline and the fourth ring gear R4 and the rotation member B2-1 are connected (engaged) by the engagement member D1-1. On the other hand, in a case where the engagement member D1-1 is positioned at a rear position within the moving range thereof (i.e., see FIG. 7), the second spline grooves D1-3 of the engagement member D1-1 are disengaged from the rotation member spline grooves B2-5 of the rotation member B2-1, and thus the fourth ring gear R4 and the rotation member B2-1 are disengaged.

A fork engagement groove D1-5 is formed at a rear portion of the engagement member D1-1. The fork member 72 is engaged with the form engagement groove D1-5. The fork member 72 is provided movably in the front-rear direction (the direction of rotation axis L). The fork member 72 extends outwardly in a radial direction of the engagement member D1-1 (extends from the outer periphery of the engagement member D1-1) and extends inside the oil pan 45 of the outside of the housing H. The fork member 72 is moved in the front-rear direction by the dog clutch actuator 71. The dog clutch actuator 71 is actuated in accordance with commands from the control portion 2. A hydraulic pressure type and an electric type may be applied as the dog clutch actuator 71. According to the embodiment, the dog clutch actuator 71 is positioned inside the oil pan 45 that is outside the housing H.

Figure 2:
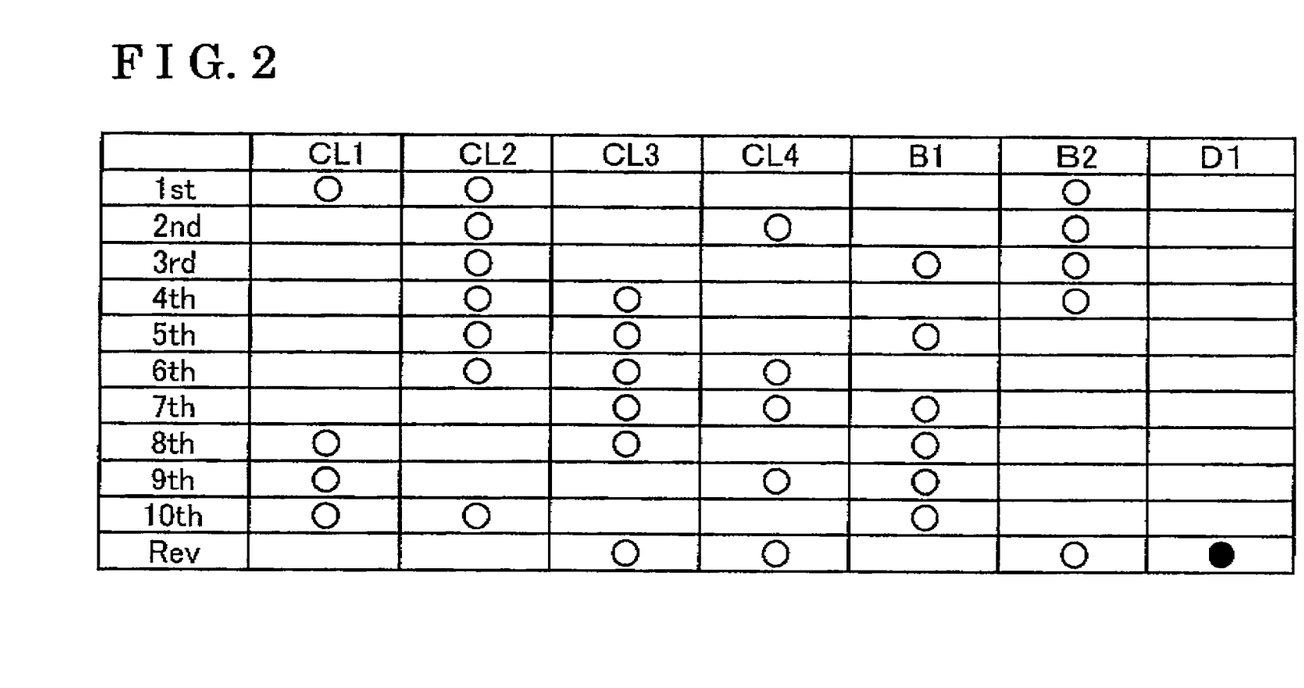
FIG. 2 shows operation states of brakes and clutches at each selected gear stage of the automatic transmission according to the first embodiment disclosed here.

An operation of the automatic transmission 100 according to the first embodiment will be explained as follows. According to the automatic transmission 100 of the first embodiment, the first to fourth clutches CL1-CL4 are selectively engaged and disengaged and the first and second brakes B1, B2 are selectively actuated to restrict the rotation of elements of the first to fourth planetary gear mechanisms P1-P4, thus, ten forward speeds and one reverse speed can be attained. In FIG. 2, a white-colored circle for clutches CL1-CL4 indicates that the clutch CL1-CL4 is in a connected state (engaged state), which is actuated state (ON state). A white-colored circle for brakes B1, 62 indicates that the brake B1, B2 is in a rotation restricting state (engaged state), which is actuated state (ON state). A black-colored circle for the dog clutch indicates that the dog clutch D1 is in an operating state and the dog clutch D1 is in a disconnected state (disengaged state).

Generally, according to a single pinion gear type planetary gear mechanism, relationships of sun gear rotation speed Ns, carrier rotation speed Nc, ring gear rotation speed Nr, and a gear ratio λ of the planetary gear mechanism is described as Equation 1. The gear ratio at each shift stage (speed) is calculated on the basis of Equation 1. Provided that the numbers of teeth of the first to fourth sun gears S1-S4 of the first to fourth planetary gear mechanisms P1-P4 are defined as Zs1-Zs4 and the numbers of teeth of the first to fourth ring gears R1-R4 are defined as Zr1-Zr4, the gear ratios λ1-λ4 of the first to fourth planetary gear mechanisms P1-P4 are defined as follows: λ1=Zs1/Zr1, λ2=Zs2/Zr2, λ3=Zs3/Zr3, λ4=Zs4/Zr4.

$$Nr=(1+\lambda)Nc-\lambda Ns \qquad \text{Equation 1}$$

Figure 3:
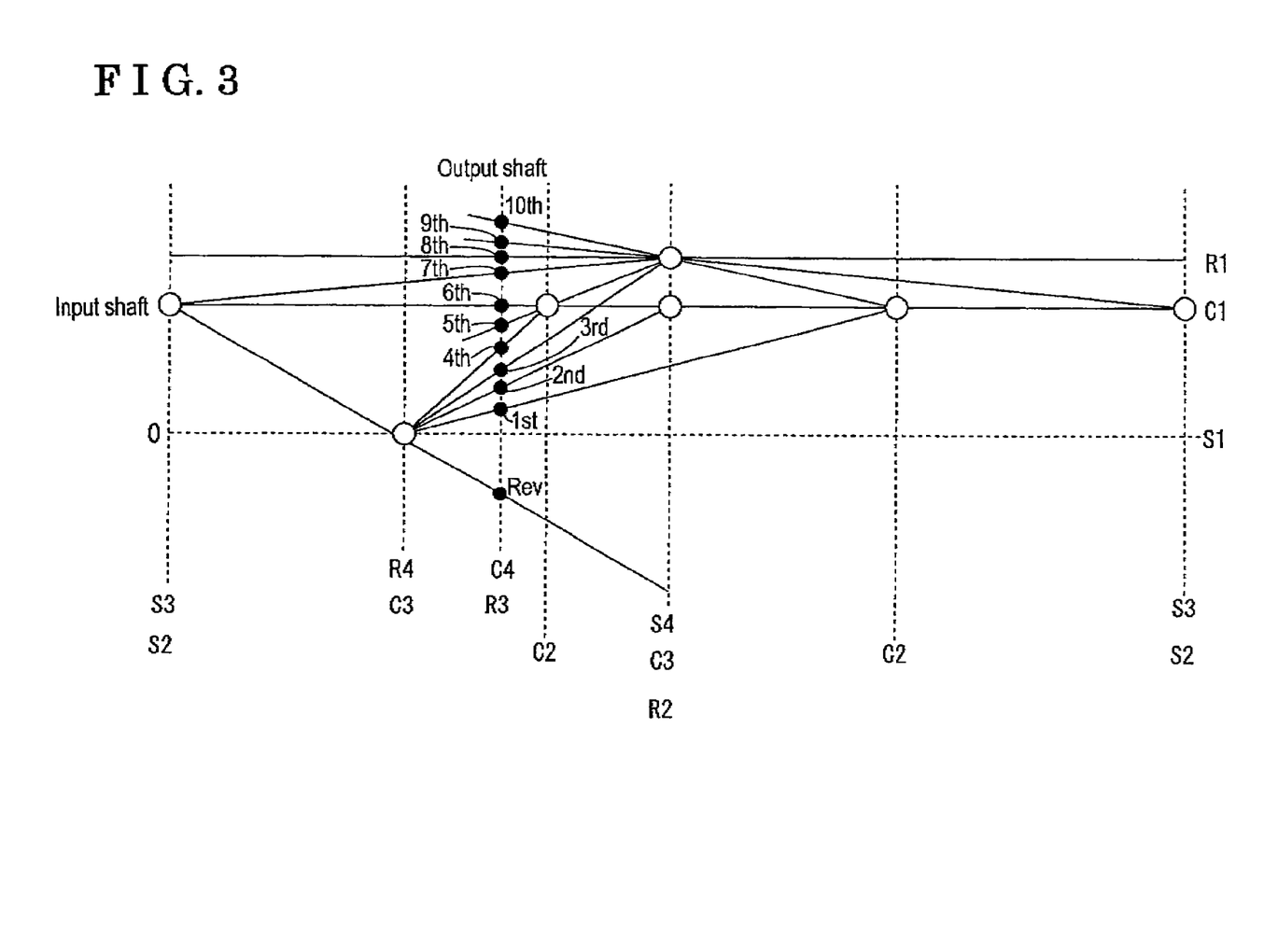
FIG. 3 is a velocity diagram for a speed ratio of each element of a planetary gear mechanism at each of speed stages of the automatic transmission according to the first embodiment disclosed here.

In a case where the first and second brakes are selectively operated and the first to fourth clutches CL1-CL4 are selectively connected, speed ratios for the elements of the first to fourth planetary gear mechanisms P1-P4 can be shown in a velocity diagram in FIG. 3. In the velocity diagram, elements of the sun gear, the carrier, and the ring gear of the planetary gear mechanisms are arranged with intervals corresponding to the gear ratio in a lateral axis direction, and speed ratios corresponding to the elements are arranged in a vertical direction.

For example, in a case where the second sun gear S2 and the third sun gear S3 are connected via the second clutch CL2 to be a single rigid member, a speed ratio common to the second sun gear S2 and the third sun gear S3 can be indicated on a single vertical line indicated with S2, S3. Further, in a case where the second ring gear R2, the second ring carrier C3, and the fourth sun gear S4 are connected via the first clutch CL1 to be a single rigid member, a speed ratio common to the connected second ring gear R2, the third carrier C3, and the fourth sun gear S4 can be indicated on a single line indicated with R2, C3, S4. A speed ratio of the second carrier C2 can be indicated on a single line indicated with C2. Still further, in a case where the third carrier C3 and the fourth ring gear R4 are connected via the third clutch CL3 to be a single rigid member, a speed ratio common to the connected third carrier C3 and the fourth ring gear R4 can be indicated on a single line indicated with C3, R4. In those circumstances, a speed ratio is a ratio relative to a rotation speed of the input shaft N.

Because a single pinion type planetary gear mechanism is applied as the second planetary gear mechanism P2, a distance between the vertical line for the second sun gear S2 and the vertical line for the second carrier C2 is defined as one (1), and the vertical line for the second ring gear R2 is positioned at the position opposite from the vertical line for the second sun gear S2 relative to the vertical line for the second carrier C2, the vertical line for the second ring gear R2 positioned being away from the vertical line for the second carrier C2 by a distance λ2. Because a single pinion type planetary gear mechanism is applied as the third planetary gear mechanism P3, a distance between the vertical line for the third sun gear S3 and the vertical line for the third carrier C3 is defined as one (1), and the vertical line for the third ring gear R3 is positioned opposite from the vertical line for the third sun gear S3 relative to the vertical line for the third carrier C3, the vertical line for the third ring gear R3 positioned being away from the vertical line for the third carrier C3 by a distance λ3. Because a single pinion type planetary gear mechanism is applied as the fourth planetary gear mechanism P4, a distance between the vertical line for the fourth sun gear S4 and the vertical line for the fourth carrier C4 is defined as one (1), and the vertical line for the fourth ring gear R4 is positioned opposite from the vertical line for the fourth sun gear S4 relative to the vertical line for the fourth carrier C4, the vertical line for the fourth ring gear R4 positioned being away from the vertical line for the fourth carrier C4 by a distance λ4.

For example, in the first speed (first shift stage) according the automatic transmission 100, according to FIG. 2, the first clutch CL1, the second clutch CL2, and the second brake B2 are in operation. In those circumstances, first, by the actuation of the first clutch CL1 and the second clutch CL2, the first to third planetary gear mechanisms P1-P3 are integrally connected, and the rotational drive force of the input shaft N inputted to the second carrier C2 is transmitted to the fourth sun gear S4. Because the fourth ring gear R4 is braked by the second brake B2, the speed of the rotational drive force inputted from the fourth sun gear S4 is reduced with a gear ratio in accordance with the number of teeth, and the rotational drive force is transmitted to the output shaft T from the fourth carrier C4 via the output shaft connection member 4.

In order to change the shift stages from the first speed (first shift stage) to the second speed (second shift stage), the actuated engaging element is switched from the first clutch CL1 to the fourth clutch CL4 while maintaining the actuations of the second clutch CL2 and the second brake B2. In this state, first, by the actuation of the second clutch CL2 and the fourth clutch CL4, the first and the second planetary gear mechanisms P1, P2 are integrally connected, and the rotational drive force of the input shaft N inputted to the second ring gear R2 is transmitted to the fourth sun gear S4. Because the fourth ring gear R4 is braked by the second brake B2, the speed of the rotational drive force inputted from the fourth sun gear S4 is reduced with a gear ratio in accordance with the number of teeth, and the rotational drive force is transmitted to the output shaft T from the fourth carrier C4 via the output shaft connection member 4.

According to the automatic transmission 100, by selectively actuating three engaging elements among six engaging elements, as illustrated in the velocity diagram in FIG. 3, multiple speeds (multiple shift stages) having different gear ratios from one another are established. Further, according to the automatic transmission 100, as illustrated in FIG. 2, by changing one of three actuated engaging elements, the shift stage is changed to an adjacent shift stage.

When a reverse shift stage is established according to the automatic transmission 100, as shown in FIG. 2, the third clutch CL3, the fourth clutch CL4, the second brake B2, and the dog clutch D1 are in operation, or are actuated. In those circumstances, because the first carrier C1 and the third sun gear S3 are connected by the fourth clutch CL4, the rotational drive force of the input shaft N is transmitted to the third sun gear S3. Further, because the third carrier C3 is fixed to the housing H by the second brake B2 and the third clutch CL3, the speed of the rotational drive force of the third sun gear S3 is reduced in a reverse rotational direction to be transmitted to the output shaft T from the third ring gear R3 via the fourth carrier C4, thus the vehicle moves in a reverse direction.

Further, the fourth ring gear R4 is disengaged from the rotation member B2-1 by the operation of the dog clutch D1, the fourth ring gear R4 is disengaged from the housing H (the fixation of the fourth ring gear R4 relative to the housing H is released) so that the fourth ring gear R4 becomes rotatable relative to the housing H. Accordingly, because no member supports a reaction force, or reactive force at the fourth planetary gear mechanism P4 in this state, the fourth sun gear S4 does not rotate in a reverse direction in response to the rotation of the fourth carrier C4 in the reverse direction. Consequently, because the first ring gear R1 that is connected to the fourth sun gear S4 does not rotate in the reverse direction, the first sun gear S1 does not rotate in high speed in response to a normal rotation of the first carrier C1.

The operation of the dog clutch D1 in a disengaging direction is performed after an engaged state of the third clutch CL3 and the second brake B2 are established (the dog clutch D1 is disengaged after the third clutch CL3 and the second brake B2 are engaged). Thus, because the fourth ring gear R4 is fixed to the housing H and the rotational drive force is not applied to the fourth ring gear R4, the engagement member D1-1 is readily moved backwards (moved in a disengaging direction) and the dog clutch D1 is disengaged.

Further, in a case where a forward shift stage is established according to the automatic transmission 100, the dog clutch D1 is engaged. However, in case of before changing the shift stages from the reverse shift stage to a forward shift stage, because the shift stage is changed to the forward shift stage via a neutral state according to the automatic transmission 100, the dog clutch D1 is operated in an engaging direction in a state where the rotation of the fourth ring gear R4 is stopped and the rotational drive force is not transmitted to the fourth ring gear R4. Thus, the engagement member D1-1 is readily engaged with the fourth ring gear R4 and the rotation member B2-1 via the spline to engage the dog clutch D1 (to establish the engaged state of the dog clutch D1).

According to the automatic transmission 100 of the embodiment described above, in a case where the reverse shift stage is established where the third clutch CL3 the fourth clutch CL4, and the second brake B2 are engaged, the dog clutch D1 operates in the disengaging direction, the fourth ring gear R4 of the fourth planetary gear mechanism P4 serving as a planetary gear mechanism positioned at a last row (rearmost row) is disengaged from the housing H. In those circumstances, because no member supports the reactive force at the fourth planetary gear mechanism P4, the fourth sun gear S4 does not rotate in a reverse direction in response to a reverse rotation of the fourth carrier C4. In consequence, because the first ring gear R1 of the first planetary gear mechanism P1 serving as a planetary gear mechanism positioned at the first row (foremost row) and is connected to the fourth sun gear S4 does not rotate in a reverse direction, the first sun gear S1 does not rotate in high speed in response to a normal rotation of the first carrier C1 (see FIG. 9).

Accordingly, durability of members, for example, a bearing that support the first sun gear S1 is enhanced. Further, a relative rotation speed of the second brake B2 that is connected to the first sun gear S1 does not increase to be high, thus, the damages to the second brake B2, for example, being burned can be prevented.

Figure 9:
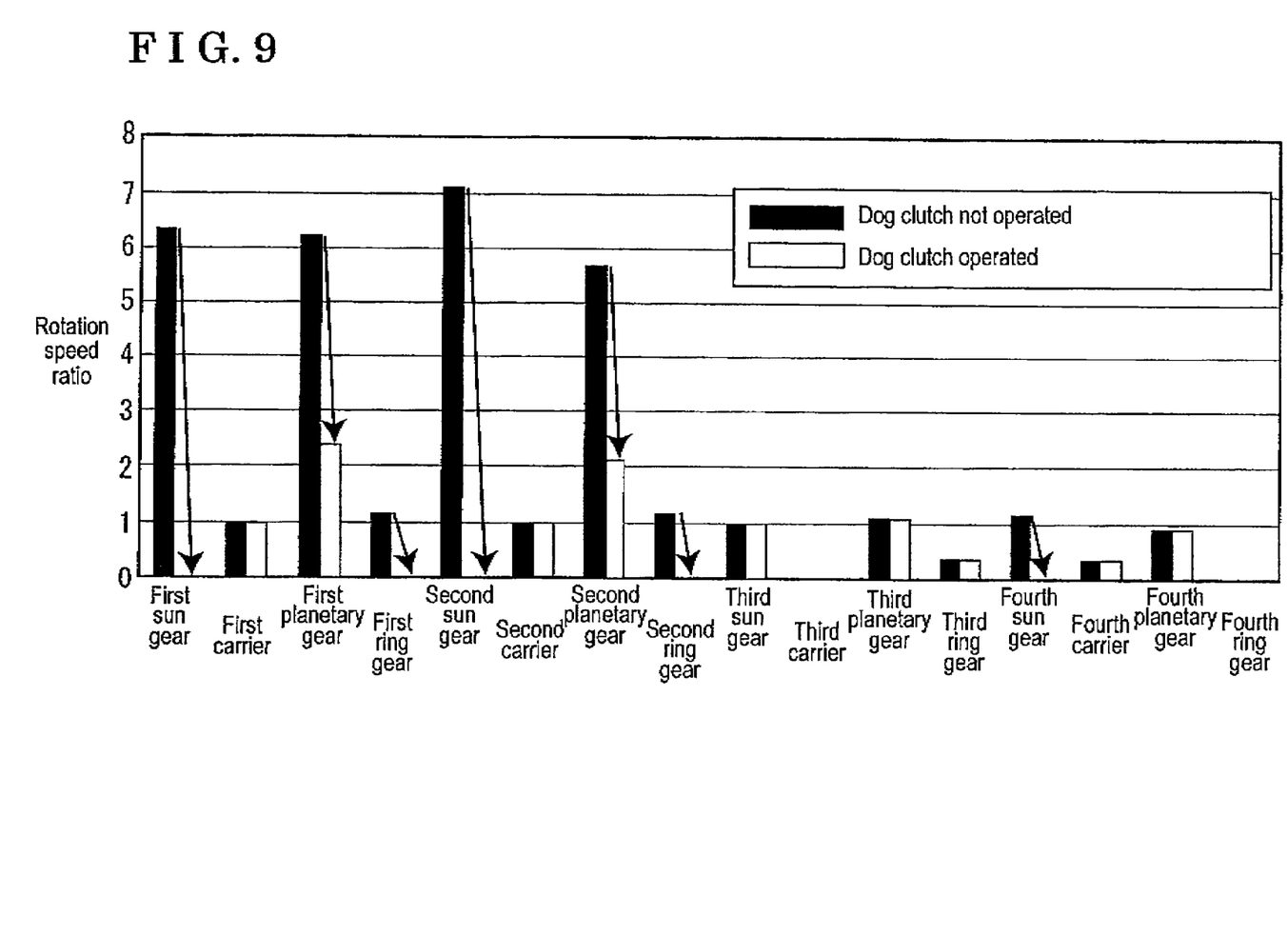
FIG. 9 shows a graph showing a rotation speed ratio of each of elements that structure a planetary gear mechanism in cases where the dog clutch is operated and where the dog clutch is not operated.

As illustrated in FIG. 9, in a case where the reverse shift stage is established, the rotation speed of the first sun gear S1 becomes zero (0) and rotation speed of each of the elements rotationally connected to the fourth sun gear S4 declines or becomes zero, thus, the durability of each of the elements is enhanced, the sliding resistance is reduced, and fuel efficiency of the vehicle is enhanced. FIG. 9 shows rotation speed ratio of each of the elements in a case where the reverse shift stage is established and where the rotation speed of the input shaft 1 is defined as one (1) according to the automatic transmission 100.

Further, because the dog clutch D1 is applied as a mechanism that selectively connects (that is configured to engage and disengage) the fourth ring gear R4 and the rotation member B2-1, compared to a clutch in which frictional engagement elements are applied, an increase in friction loss in an engaged state and in a disengaged state of the clutch can be restrained, and an increase in the number of parts for the clutch can be prevented.

Further, because the engagement member D1-1 is provided between the fourth ring gear R4 and the rotation member B2-1 to be coaxial to the fourth ring gear R4 and the rotation member B2-1, the dog clutch D1 can be mounted without changing or with slightly changing the arrangement of the planetary gear mechanisms P1-P4 and the position of the planetary gear mechanisms P1-P4 in the direction of the rotation axis L. Thus, an increase in size of the automatic transmission 100 in the direction of the rotation axis line L can be restrained.

Figure 7:
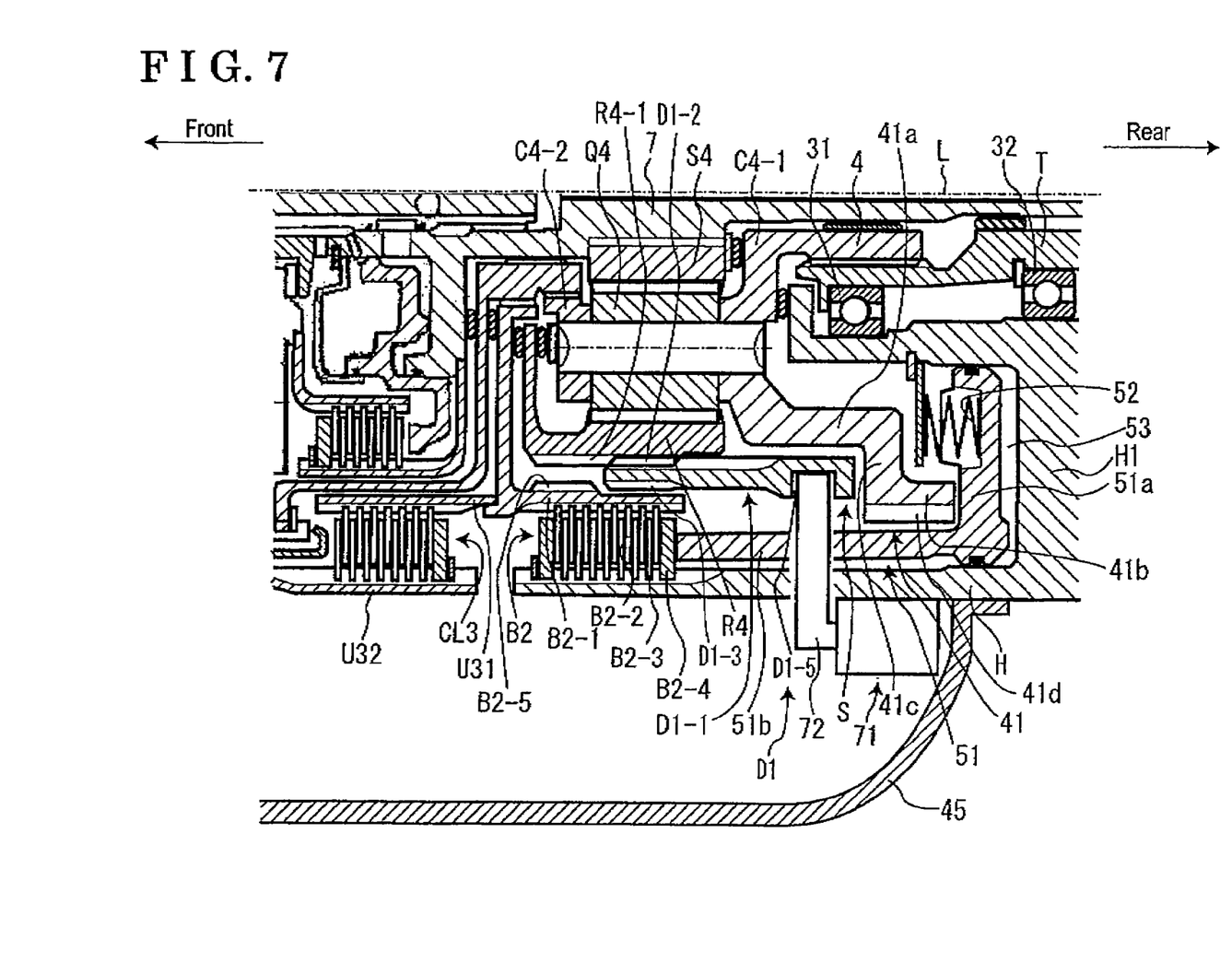
FIG. 7 is a cross-sectional view of the rear portion of the automatic transmission in a state where the dog clutch is disengaged according to the first embodiment disclosed here.

As illustrated in FIG. 4, because the output shaft T is supported at two positions by means of the bearings 31, 32, generally, space S is provided at a rear of the planetary gear mechanisms P1-P4 at the rear portion within the housing H of the automatic transmission 100 (See FIG. 4). As illustrated in FIG. 7, when the dog clutch D1 is disengaged, the engagement member D1-1 moves to the space S. Thus, because there is no need to additionally provide the space for moving the engagement member D1-1 in the rearward direction, an increase in size of the automatic transmission 100 in the direction of the rotation axis line L can be restrained.

Further, the parking member 41 integrally includes the small diameter portion 41a, the large diameter portion 41b having a diameter greater than the small diameter portion 41a, and the connection portion 41c connecting the small diameter portion 41a and the large diameter portion 41b. Thus, when the engagement member D1-1 moves in a rearward direction, the engagement member D1-1 is positioned at an outward position of the small diameter portion 41a, and does not interfere with the parking member 41. Further, because the engaging recessed portions 41d to which the engaging projection 42a of the stopper member 42 come to engage are formed on the large diameter portion 41b having a greater diameter than the small diameter portion 41a, the fourth carrier C4 is securely fixed to the housing H, and the planetary gear mechanisms P1-P4 and the output shaft T are assumed to be not rotatable relative to the housing H securely.

Further, because the engagement member D1-1 is engaged with the fourth ring gear R4 and the rotation member B2-1 via the spline, the rotational drive force is securely transmitted between the fourth ring gear R4 and the rotation member B2-1 and thus the fourth ring gear R4 and the rotation member B2-1 are securely engaged to each other or are securely disengaged from each other.

Further, the fork member 72 (serving as a transmission member) is connected to the engagement member D1-1 (connected to an outer periphery portion of the engagement member D1-1) and extends outwardly in a radial direction to transmit the drive force of the dog clutch actuator 71 to the engagement member D1-1. Thus, the dog clutch actuator 71 can be positioned at a desired position. According to the embodiment, because the dog clutch actuator 71 is positioned outside the planetary gear mechanisms P1-P4, arrangement of the planetary gear mechanisms P1-P4 and the position of the planetary gear mechanisms P1-P4 in the direction of the rotation axis line L do not have to be changed, thus, an increase of the automatic transmission 100 in size in the rotation axis direction can be securely prevented.

According to the first embodiment described above, in a case where the engagement member D1-1 is positioned at a rear position within the moving range thereof, the second spline groove D1-3 of the engagement member D1-1 is disengaged from the rotation member spline groove B2-5 of the rotation member B2-1 so that the fourth ring gear R4 and the rotation member B2-1 are disengaged from each other. However, the construction is not limited. For example, according to an alternative construction, the first spline groove D1-2 of the engagement member D1-1 may be configured to disengage from the ring gear spline groove R4-1 of the fourth ring gear R4.

A second embodiment of the automatic transmission will be explained as follows. The construction of the automatic transmission 100 described above is not limited to the automatic transmission shown in FIG. 1, and may be widely applied to an automatic transmission in which a sun gear of a planetary gear mechanism positioned at the first row (foremost row) rotates in high speed because of a reverse rotation of a ring gear of the planetary gear mechanism positioned at the first row (foremost row) in response to a reverse rotation of a carrier of a planetary gear mechanism positioned at a last row (rearmost row) when a reverse shift stage is established. According to the automatic transmission of this type, the ring gear of the planetary gear mechanism positioned at the first row (foremost row) is directly connected to a sun gear of the planetary gear mechanism positioned at the last row (rearmost row), and plural planetary gear mechanisms rotatably supported by a housing to be coaxial to a rotation axis, an input shaft directly connected to a carrier of the planetary gear mechanism positioned at the first row (foremost row), and an output shaft directly connected to a carrier of the planetary gear mechanism positioned at the last row (rearmost row).

The automatic transmission of this type will be explained as an automatic transmission 200 according to a second embodiment. Constructions of the automatic transmission 200 according to the second embodiment which are different from the constructions of the transmission 100 according to the first embodiment will be explained hereinafter, Explanations for structures of the automatic transmission 200 according to the second embodiment common to the automatic transmission 100 according to the first embodiment will not be repeated, and the same reference numbers to the automatic transmission 100 are provided.

Figure 8:
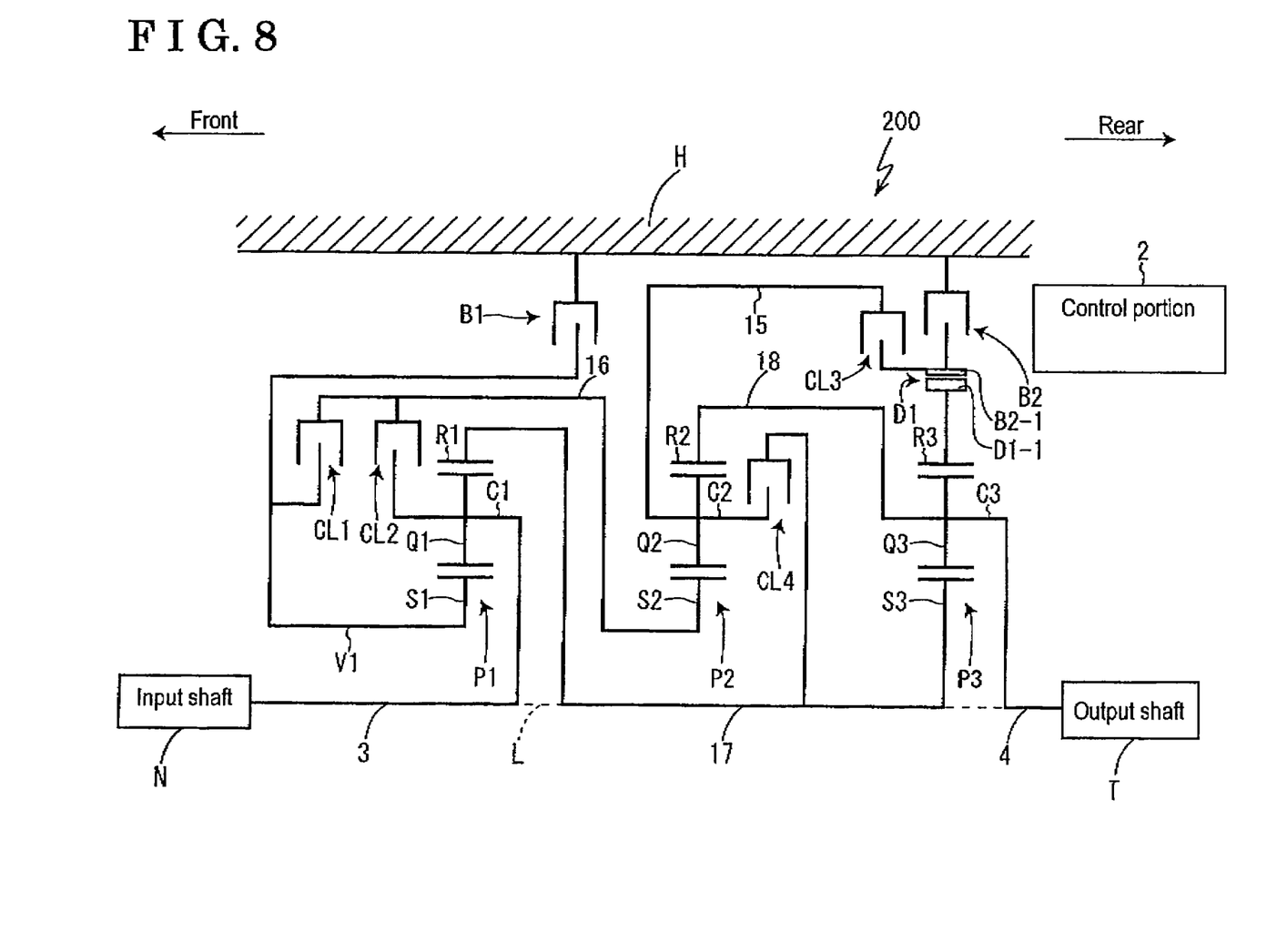
FIG. 8 is a schematic view of an automatic transmission according to a second embodiment disclosed here.

As illustrated in FIG. 8, the automatic transmission 200 according to the second embodiment includes three planetary gear mechanisms P1-P3 that are arranged in the direction of the rotation axis L from an input side (i.e., left-hand side in FIG. 8; defined as a front side) towards an output side (i.e., right-hand side in FIG. 8, defined as a rear side).

The output shaft T is directly connected to the third carrier C3 via the output shaft connection member 4. The first ring gear R1 and the third sun gear S3 are directly connected via a third gear connection member 17 extending in the direction of the rotational axis L passing through an inner side relative to the second sun gear S2. The second ring gear R2 and the third carrier C3 are directly connected via a fourth gear connection member 18.

The first brake B1 brakes the rotation of the first sun gear S1 directly connected to the first brake connection member V1 via the first brake connection member V1. The second brake B2 brakes the rotation of the rotation member B2-1.

The first clutch CL1 is directly connected to the second sun gear S2 via a second sun gear connection member 16, and selectively connects (engages and disengages) the second sun gear S2 and the first brake connection member V1. The second clutch CL2 is directly connected to the second sun gear S2 via the second sun gear connection member 16, and selectively connects (engages and disengages) the first carrier C1 and the second sun gear S2. The third clutch CL3 is directly connected to the second carrier C2 via a second clutch connection member 15, and selectively connect (engages and disengages) the second carrier C2 and the rotation member B2-1. The fourth clutch CL4 is directly connected to a third gear connection member 17, and selectively connects (engages and disengages) the second carrier C2 and the third gear connection member 17. The dog clutch D1 selectively connects (engages and disengages) the third ring gear R3 and the rotation member B2-1.

According to the automatic transmission 200 of the second embodiment, the reverse shift stage is established by engaging the second clutch CL2, the third clutch CL3, and the second brake B2. In this engagement state, because the first carrier C1 and the second sun gear S2 are connected by the second clutch CL2, the rotational drive force of the input shaft N is transmitted to the second sun gear S2. Then, because the second carrier C2 is fixed to the housing H by the second brake B2 and the third clutch CL3, the speed of the rotational drive force of the second sun gear S2 is reduced in a reverse rotation direction to be transmitted from the second ring gear R2 to the output shaft T via the third carrier C3, thus, the vehicle moves in a rearward direction (reverse direction).

According to the automatic transmission 200 of the second embodiment, when the reverse shift stage is established, the third ring gear R3 is disengaged from the rotation member B2-1 by the dog clutch D1. In consequence, the third ring gear R3 of the third planetary gear mechanism P3 serving as the planetary gear mechanism positioned at the last row (rearmost row) is disengaged from the housing H, which establishes a state where no member supports a reactive force at the third planetary gear mechanism P3. Accordingly, the third sun gear S3 does not rotate in a reverse direction in response to the reverse rotation of the third carrier C3. Thus, because the first ring gear R1 of the first planetary gear mechanism P1 serving as the planetary gear mechanism positioned at the first row (foremost row) that is connected to the third sun gear S3 does not rotate in a reverse direction, the first sun gear S1 does not rotate in high speed in response to a normal rotation of the first carrier C1.

According to the embodiment, an automatic transmission (100, 200), which includes a housing (H), plural planetary gear mechanisms (P1, P2, P3, P4) rotatably supported by the housing (H) to be coaxial to a rotation axis (L), the plural planetary gear mechanisms (P1, P2, P3, P4) including a planetary gear mechanism positioned at a foremost row (P1) which includes a ring gear (R1) and a carrier (C1), and a planetary gear mechanism positioned at a rearmost row (P4, P3) which includes a sun gear (S4, S3), a carrier (C4, C3) and a ring gear (R4, R3), the ring gear (R1) of the planetary gear mechanism positioned at the foremost row (P1) being connected to the sun gear (S4, S3) of the planetary gear mechanism positioned at the rearmost row (P4, P3), an input shaft (N) rotatably supported by the housing (H) to be rotatable about the rotation axis (L) and being connected to the carrier (C1) of the planetary gear mechanism positioned at the foremost row (P1), an output shaft (T) rotatably supported by the housing (H) to be rotatable about the rotation axis (L) and being connected to the carrier (C4, C3) of the planetary gear mechanism positioned at the rearmost row (P4, P3), a rotation member (B2-1) positioned at a radially outward of the ring gear (R4, R3) of the planetary gear mechanism positioned at the rearmost row (P4, P3) to be rotatable coaxially to the ring gear of the planetary gear mechanism positioned at the rearmost row (P4, P3), a brake (B2) selectively fixing the rotation member (B2-1) to the housing (H), a clutch (CL3, CL2) selectively connecting the rotation member (B2-1) and a carrier (C3, C2) of the planetary gear mechanism (P3, P2) positioned at front relative to the planetary gear mechanism positioned at the rearmost row (P4, P3) by one, and a dog clutch (D1) selectively connecting the ring gear (R4, R3) of the planetary gear mechanism positioned at the rearmost row (P4, P3) and the rotation member (B2-1).

According to the automatic transmission constructed as described above, when the dog clutch (D1) is operated in a disengaging direction in a case where the reverse shift stage is established where the brake (B2) and the clutch (CL3) are engaged, the ring gear of the planetary gear mechanism positioned at the rearmost row is disengaged from the housing (H), and thus a state where no member supports a reactive force at the planetary gear mechanism positioned at the rearmost row is established. In consequence, the sun gear of the planetary gear mechanism positioned at the rearmost row does not rotate in a reverse direction in response to a reverse rotation of the carrier of the planetary gear mechanism positioned at the rearmost row. Thus, because the ring gear of the planetary gear mechanism positioned at the foremost row connected to the sun gear of the planetary gear mechanism positioned at the rearmost row does not rotate in a reverse direction, the sun gear of the planetary gear mechanism positioned at the foremost row does not rotate in high speed in response to a normal rotation of the carrier of the planetary gear mechanism positioned at the foremost row.

Further, according to the transmission (100, 200) of the embodiments, because the dog clutch (D1) is applied as the mechanism for selectively connecting the ring gear of the planetary gear mechanism positioned at the rearmost row and the rotation member (B2-1), compared to a clutch in which a frictional engagement element is applied, an increase in the friction loss in an engaged state and a disengaged state of the clutch can be restrained, and thus, an increase in the number of parts of the clutch can be prevented.

According to the embodiment, the automatic transmission (100, 200) further includes an engagement member (D1-1) selectively engaging the ring gear (R4, R3) of the planetary gear mechanism positioned at the rearmost row (P4, P3) and the rotation member (B2-1) by moving in the direction of the rotation axis (L), and a dog clutch actuator (71) moving the engagement member (D1-1) in the direction of the rotation axis (L). The dog clutch (D1) is formed in a cylindrical shape, is provided between the ring gear (R4, R3) of the planetary gear mechanism positioned at the rearmost row (P4, P3) and the rotation member (B2-1) to be coaxial to the ring gear (R4, R3) of the planetary gear mechanism positioned at the rearmost row (P4, P3) and the rotation member (B2-1) and to be movable in the direction of the rotation axis (L), is formed with a first spline groove (D1-2) engaged with an outer periphery surface of the ring gear (R4, R3) at an inner periphery surface thereof via a spline, and is formed with a second spline groove (D1-3) engaged with an inner periphery surface of the rotation member (B2-1) at an outer periphery surface thereof via a spline.

According to the construction of the embodiment, because the engagement member (D1-1) is provided between the ring gear of the planetary gear mechanism positioned at the rearmost row and the rotation member (B2-1) to be coaxial to the ring gear of the planetary gear mechanism positioned at the rearmost row and the rotation member (B2-1), the dog clutch (D1) can be mounted without changing or with slightly changing the arrangement of the planetary gear mechanism and the position of the planetary gear mechanism in the direction of the rotation axis (L), and thus an increase of the automatic transmission (100, 200) in size in the direction of the rotation axis (L) can be restrained. Further, because the engagement member (D1-1) is engaged with the ring gear of the planetary gear mechanism positioned at the rearmost row and the rotation member (B2-1) via a spline, the rotation drive force is securely transmitted between the ring gear of the planetary gear mechanism positioned at the rearmost row and the rotation member (B2-1), and the ring gear of the planetary gear mechanism positioned at the rearmost row and the rotation member (B2-1) can be securely engaged or disengaged.

According to the embodiment, the automatic transmission further includes a transmission member (72) connected to the engagement member (D1-1) to extend radially outward of the engagement member (D1-1), the transmission member (72) transmitting a drive force of the dog clutch actuator (71) to the engagement member (D1-1).

According to the construction of the embodiment, the dog clutch actuator (71) can be arranged at a desired position. For example, provided that the dog clutch actuator (71) is positioned at a radially outward of the planetary gear mechanism, because there is no need to change the arrangement of the planetary gear mechanism and the position of the planetary gear mechanism in the direction of the rotation axis, an increase of the automatic transmission in size in the direction of the rotation axis can be securely prevented.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An automatic transmission, comprising;
a housing;
a plurality of planetary gear mechanisms rotatably supported by the housing to be coaxial to a rotation axis, the plurality of planetary gear mechanisms including a planetary gear mechanism positioned at a foremost row in a forward direction which includes a ring gear and a carrier, and a planetary gear mechanism positioned at a rearmost row in a rearward direction which includes a sun gear, a carrier and a ring gear, the ring gear of the planetary gear mechanism positioned at the foremost row being connected to the sun gear of the planetary gear mechanism positioned at the rearmost row;
an input shaft rotatably supported by the housing to be rotatable about the rotation axis and being connected to the carrier of the planetary gear mechanism positioned at the foremost row;
an output shaft rotatably supported by the housing to be rotatable about the rotation axis and being connected to the carrier of the planetary gear mechanism positioned at the rearmost row;
a rotation member positioned radially outward of the ring gear of the planetary gear mechanism positioned at the rearmost row to be rotatable coaxially to the ring gear of the planetary gear mechanism positioned at the rearmost row;
a brake selectively fixing the rotation member to the housing;
a clutch selectively connecting the rotation member and a carrier of the planetary gear mechanism positioned forward of the planetary gear mechanism positioned at the rearmost row; and
a dog clutch selectively connecting the ring gear of the planetary gear mechanism positioned at the rearmost row and the rotation member.

2. The automatic transmission according to claim 1 further comprising:
an engagement member selectively engaging the ring gear of the planetary gear mechanism positioned at the rearmost row and the rotation member by moving in the direction of the rotation axis; and
a dog clutch actuator moving the engagement member in the direction of the rotation axis;
wherein the dog clutch is formed in a cylindrical shape, is provided between the ring gear of the planetary gear mechanism positioned at the rearmost row and the rotation member to be coaxial to the ring gear of the planetary gear mechanism positioned at the rearmost row and the rotation member and to be movable in the direction of the rotation axis, is formed with a first spline groove engaged with an outer periphery surface of the ring gear at an inner periphery surface thereof via a spline, and is formed with a second spline groove engaged with an inner periphery surface of the rotation member at an outer periphery surface thereof via a spline.

3. The automatic transmission according to claim 2 further comprising:
a transmission member connected to the engagement member to extend radially outward of the engagement member, the transmission member transmitting a drive force of the dog clutch actuator to the engagement member.

* * * * *